United States Patent
Volohovs (10) Patent No.: US 11,472,683 B2
(45) Date of Patent: Oct. 18, 2022

(54) WINCH

(71) Applicant: Dmitrijs Volohovs, Riga (LV)

(72) Inventor: Dmitrijs Volohovs, Riga (LV)

( * ) Notice: Subject to any disclaimer, the term of this patent is extended or adjusted under 35 U.S.C. 154(b) by 268 days.

(21) Appl. No.: 16/750,288

(22) Filed: Jan. 23, 2020

(65) Prior Publication Data
US 2020/0239287 A1    Jul. 30, 2020

(30) Foreign Application Priority Data
Jan. 24, 2019   (EP) ..................... 19153492

(51) Int. Cl.
*B66D 1/56*  (2006.01)
*B66D 1/48*  (2006.01)
*B66D 1/58*  (2006.01)

(52) U.S. Cl.
CPC ............... *B66D 1/56* (2013.01); *B66D 1/485* (2013.01); *B66D 1/58* (2013.01)

(58) Field of Classification Search
CPC . B66D 1/485; B66D 1/56; B66D 1/58; B66D 3/24; H02G 11/02
See application file for complete search history.

(56) References Cited

U.S. PATENT DOCUMENTS

| | | | | |
|---|---|---|---|---|
| 722,867 A | * | 3/1903 | Mitchell | B66D 3/24 254/269 |
| 826,529 A | * | 7/1906 | Baldwin | B66D 3/24 254/269 |
| 2,053,055 A | * | 9/1936 | Wadd | B66D 3/24 254/269 |
| 3,565,402 A | * | 2/1971 | Linke | B66D 1/56 254/269 |
| 2013/0248297 A1 | | 9/2013 | Manes et al. | |

FOREIGN PATENT DOCUMENTS

| | | | | |
|---|---|---|---|---|
| EP | 1616836 A2 | * | 1/2006 | ............... B66D 1/56 |
| EP | 2466252 B1 | | 7/2013 | |
| KR | 100283680 B1 | * | 4/2001 | |
| WO | 2008048561 A2 | | 4/2008 | |

OTHER PUBLICATIONS

EP Office Action priority application EP 19 15 3495, dated Jul. 8, 2019.

* cited by examiner

*Primary Examiner* — Sang K Kim
*Assistant Examiner* — Nathaniel L Adams
(74) *Attorney, Agent, or Firm* — Hayes Soloway PC (57) ABSTRACT

A winch (100, 200) includes a rope (105), an overwinding sensor (106) coupled to the rope (105) where the overwinding sensor (106) is moveable between a first position and a second position upon winding and/or unwinding of the rope (105). The overwinding sensor (106) includes a first electrically conducting member, a contact member (104) having a second electrically conducting member which is contactable by the first electrically conducting member when the overwinding sensor (106) is in the second position. The second electrically conducting member is not contactable by the first electrically conducting member when the overwinding sensor (106) is in the first position. The winch (100, 200) is configured to stop and/or prevent and/or hamper winding of the rope (105) upon establishment of an electrical contact between the first electrically conducting member and the second electrically conducting member when the overwinding sensor (106) is in the second position.

11 Claims, 8 Drawing Sheets

WINCH

BACKGROUND OF THE INVENTION

1. Field of the Invention

The present invention relates generally to a winch and a method of preventing rope slack of a rope of a winch, in particular when the winch is transported and/or unpowered.

2. Description of the Prior Art

In winches according to the state of the art, an overwinding prevention mechanism used in winches utilizes a sensor which consists of, for example, a magnet on a rope and a Hall sensor arranged at the winch. This is known as a contactless sensor which may be implemented in the overwinding prevention mechanism of the winch. For example, EP 2 466 252 B1 describes a winch, comprising a cable roll, configured to wind and unwind a cable, a cable, wherein one end of the cable is fixed to the cable roll, and wherein its other end is configured to electrically connect an electric device to the cable and wherein the cable is further configured to provide the electric device with electric power and/or with data, a framework to which the cable roll is mounted, measuring means connected to the framework and configured to provide data related to the length of the unwound part of the cable, and processing means configured to control winding and unwinding of the cable, based on the data provided by the measuring means, wherein there is a predetermined fixed reference point on the cable, and there is a predetermined reference state of the cable, at which the predetermined fixed reference point is at a reference position in relation to a coordinate system, and wherein the length of unwound cable is defined as the distance measured along the cable, between the location of the predetermined fixed reference point and the reference position.

Another example of an overwinding prevention mechanism is a mechanical pressure switch or actuator, located at a winch frame, and activated by a load or stopper when the load or stopper reaches a specific position when winding the rope.

A disadvantage of using a contactless sensor is that different magnets and Hall sensors may vary in terms of the magnetic fields produced and the sensitivity of the Hall sensor, respectively.

A disadvantage of using a mechanical pressure switch or actuator is that an additional tension force created may be exerted onto the rope. Inertia of the winch motor may hereby prevent an immediate stop of the rope drum when winding the rope, such that there may be a risk that the rope breaks.

There is therefore a need for improvements of winches.

SUMMARY OF THE INVENTION

A winch and a method of preventing rope slack of a rope of a winch according to the present disclosure are set out in the independent claims. Preferred embodiments of the winch are outlined in the dependent claims.

We describe a winch comprising: a rope; an overwinding sensor coupled to the rope, wherein the overwinding sensor is moveable between a first position and a second position upon winding and/or unwinding of the rope, and wherein the overwinding sensor comprises a first electrically conducting member; a contact member comprising a second electrically conducting member which is contactable by the first electrically conducting member when the overwinding sensor is in the second position, wherein the second electrically conducting member is not contactable by the first electrically conducting member when the overwinding sensor is in the first position; and wherein the winch is configured to stop and/or prevent and/or hamper winding of the rope upon establishment of an electrical contact between the first electrically conducting member and the second electrically conducting member when the overwinding sensor is in the second position.

A winch according to the present disclosure is simple in its construction with a minimal number of parts. The winch provides for a precise stop of the winch when the overwinding sensor reaches the second position.

The first position of the overwinding sensor may hereby relate to a position in which the rope is more unwound (i.e. removed more from, for example, a rope drum) compared to the state in which the overwinding sensor is in the second position. The second position may therefore relate to a position in which, for example, a load raisable and/or lowerable by the winch is in a higher position (based on larger parts of the rope being wound around, for example, a rope drum) compared to the height of the load when the overwinding sensor is in the first position.

In some examples, the first electrically conducting member is made of or comprises a material which is different than the material comprised in or out of which the second electrically conducting member is made. In some other examples, these materials are identical.

As outlined above, the winch is configured to stop and/or prevent and/or hamper (i.e. make (more) difficult) winding of the rope (for example around a rope drum) upon establishment of an electrical contact between the first electrically conducting member and the second electrically conducting member when the overwinding sensor is in the second position, In some examples, the winch further comprises an electric circuit, wherein the second electrically conducting member forms a part of the electric circuit, and wherein the electric circuit is shortened upon the establishment of the electrical contact between the first electrically conducting member and the second electrically conducting member when the overwinding sensor is in the second position.

The shortened electric circuit may hereby be detected by the winch itself with corresponding electronics. Alternatively or additionally, the shortened electric circuit may be detected via electronics distinct from the features of the winch.

Detecting when an electric circuit is shortened may hereby allow for very precise determination as to when the winding state of the rope is such that the rope should not be further wound so as to prevent and/or stop and/or hamper overwinding of the rope.

In some examples of the winch, the second electrically conducting member comprises a first electrically conducting contact member and a second electrically conducting contact member, wherein, when the overwinding sensor is in the second position, the first electrically conducting member of the overwinding sensor electrically connects the first electrically conducting contact member and the second electrically conducting contact member to shorten the electric circuit. The first electrically conducting member of the overwinding sensor may hereby shorten the electric circuit which comprises the first electrically conducting contact member, the second electrically conducting contact member and the first electrically conducting member. In some examples, the rope may hereby be arranged between the first electrically conducting contact member and the second electrically conducting contact member. This may allow for very precisely determining when to stop and/or prevent and/or hamper winding of the rope upon establishment of the electrical contact between the first electrically conducting member and the second electrically conducting member when the overwinding sensor is in the second position, as the winding state of the rope directly correlates to the position of the overwinding sensor which, while being coupled to the rope, directly contacts the contact member in the second position of the overwinding sensor.

In some examples, the winch further comprises a control unit electrically coupled to the contact member, wherein the control unit is configured to detect the establishment of the electrical contact between the first electrically conducting member and the second electrically conducting member when the overwinding sensor is in the second position. The control unit may hereby be a microcontroller unit. The control unit may, in some examples, be electrically coupled to the contact member so as to determine when the electric circuit is shortened upon establishment of the electrical contact between the first electrically conducting member and the second electrically conducting member. The control unit being comprised in the winch may advantageously allow for choosing a control unit with specific properties regarding sensitivity (when aiming to detect the electrical contact between the first electrically conducting member and the second electrically conducting member) in view of other electrical components of the winch, such as the first electrically conducting member and the second electrically conducting member, i.e., for example, electronic properties thereof.

In some examples of the winch, the control unit is configured to detect the establishment of the electrical contact between the first electrically conducting member and the second electrically conducting member by detecting that the electric circuit is shortened. The control unit or one or more parts thereof may be comprised in the electric circuit. The electrical contact between the first electrically conducting member and the second electrically conducting member may hereby be detected particularly easily, so as to very precisely determine as to whether or when winding of the rope should be stopped and/or prevented and/or hampered.

In some examples of the winch, the first electrically conducting member of the overwinding sensor comprises an enclosure of the overwinding sensor. Therefore, the electrical contact between the first electrically conducting member and the second electrically conducting member when the overwinding sensor is in the second position, upon which winding of the rope is stopped and/or prevented and/or hampered, may comprise an electric contact between the enclosure of the overwinding sensor and the second electrically conducting member of the contact member. Providing an enclosure of the overwinding sensor as being comprised in the first electrically conducting member allows for a simple construction of the overwinding sensor. In particular, in some examples of the winch, the electric circuit may be shortened upon the enclosure of the overwinding sensor being in contact with the second electrically conducting member of the contact member, resulting in a simple, but precise overwinding prevention mechanism.

In some examples, the winch further comprises a frame, wherein the frame comprises the contact member. This may allow for providing a winch with a particularly simple, but precise overwinding prevention mechanism (i.e. when winding of the rope should be stopped and/or prevented and/or hampered).

In some examples of the winch, the overwinding sensor further comprises: a support member fixed to the rope; and a resilient member arranged between the support member and the first electrically conducting member, wherein the resilient member is configured to bias the support member in a direction away from the contact member upon winding (for example further winding) of the rope while the overwinding sensor is in the second position.

In some examples, the resilient member may comprise a spring.

The risk of a rope breaking may be reduced by using the resilient member, as the resilient member is configured to bias the support member away from the contact member upon winding of the rope while the overwinding sensor is in the second position. Furthermore, the resilient member may prevent a sudden stop when winding the rope until when the contact between the overwinding sensor and the contact member is established via the electrical contact between the first electrically conducting member and the second electrically conducting member, thereby reducing the risk of breaking of the rope. A soft stop of the winch, i.e. stop of the winding of the rope, may hereby be ensured.

In some examples, the winch further comprises a load, wherein the resilient member is integrated into the load, and wherein the resilient member separates the rope from the load. Excessive energy from the rope may hereby be absorbed when the load is stopped or when moving of the rope is being started.

We further describe a method of preventing rope slack of a rope of a winch when the winch is transported and/or unpowered, wherein the method comprises providing a winch comprising: a rope; an overwinding sensor coupled to the rope, wherein the overwinding sensor is moveable between a first position and a second position upon winding and/or unwinding of the rope, and wherein the overwinding sensor comprises a first electrically conducting member; a contact member comprising a second electrically conducting member which is contactable by the first electrically conducting member when the overwinding sensor is in the second position, wherein the second electrically conducting member is not contactable by the first electrically conducting member when the overwinding sensor is in the first position; and wherein the winch is configured to stop and/or prevent and/or hamper winding of the rope upon establishment of an electrical contact between the first electrically conducting member and the second electrically conducting member when the overwinding sensor is in the second position; wherein the overwinding sensor further comprises: a support member fixed to the rope; and a resilient member arranged between the support member and the first electrically conducting member, wherein the resilient member is configured to bias the support member away from the contact member upon winding of the rope while the overwinding sensor is in the second position, in particular wherein the winch further comprises a load and wherein the resilient member is integrated into the load and the resilient member separates the rope from the load; winding the rope; and stopping said winding of the rope when the resilient member is in a compressed state. The method may hereby further comprise unpowering of the winch when the resilient member is in the compressed state. The method may in particular be applied when the winch is transported and/or unpowered.

In any of the examples as described herein, the enclosure of the overwinding sensor may be a decorative cover for a lighting device. Another, second enclosure of the overwinding sensor may be a lamp shade for the lighting device. The resilient member and the support member may hereby be arranged, in some examples, in an enclosure of the overwinding sensor formed by the first and second enclosures.

These and other aspects of the invention will now be further described, by way of example only, with reference to the accompanying figures, wherein like reference numerals refer to like parts.

DETAILED DESCRIPTION OF THE INVENTION

The problem solved by the winch according to the example implementations as described herein is in particular to make an overwinding sensor for a winch which is easy to manufacture, in particular based on a minimum count of parts, and which provides for a soft and precise stop of the winch when the overwinding sensor has reached a particular position.

Figure 1A:
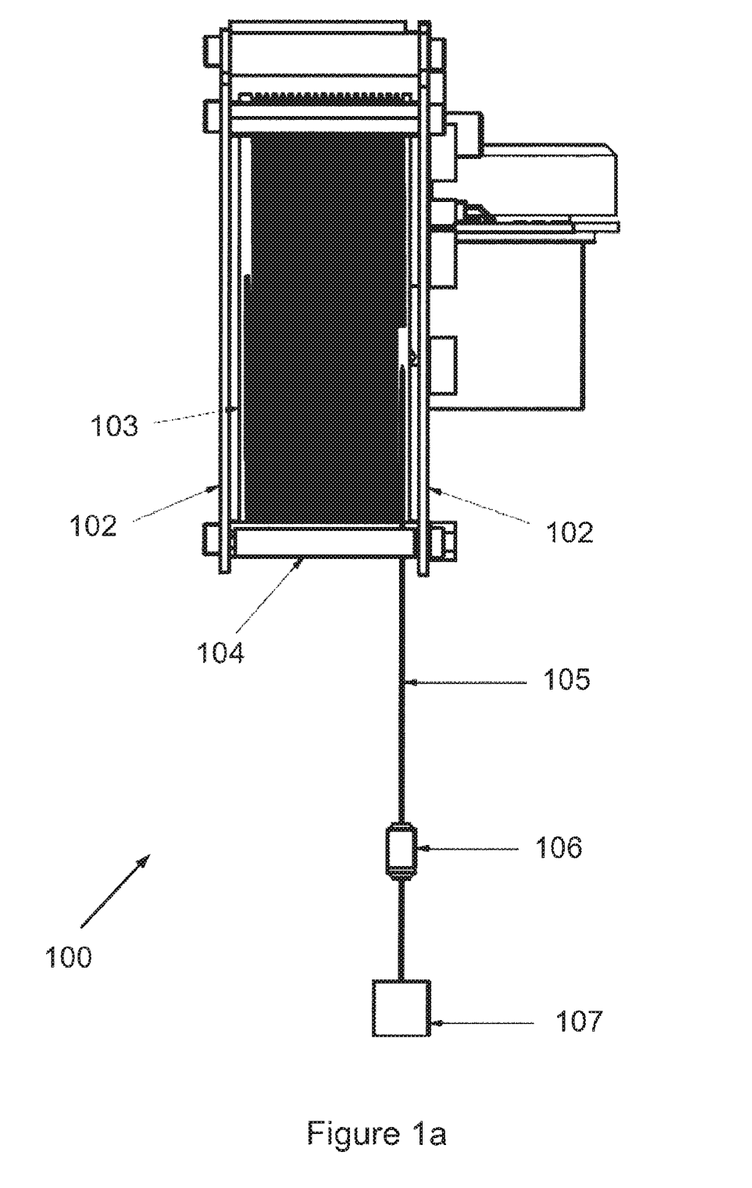
FIGS. 1a to c show schematic illustrations of a winch according to some example implementations as described herein.

FIG. 1a shows a schematic side-view of a winch 100 according to some example implementations as described herein.

The winch 100 comprises, in this example, a frame 102, a drum 103, a contact member 104, a rope 105, and an overwinding sensor 106. A load 107 is attached, in this example, to the rope 105.

Figure 1B:
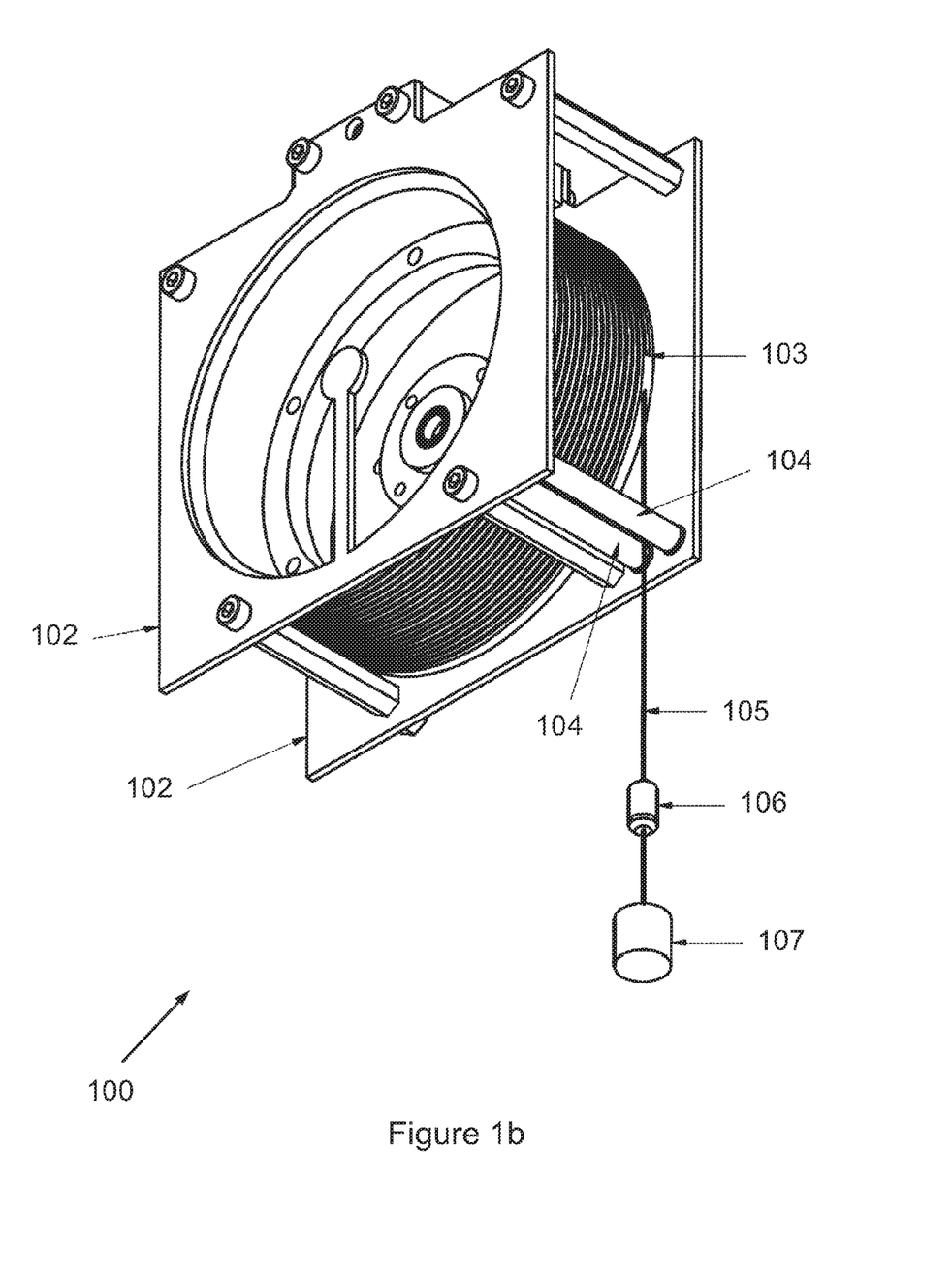

FIG. 1b shows a schematic perspective view of the winch 100. As can be seen, in this example, the contact member 104 comprises two electrically conducting contact members.

In this example, the overwinding sensor 106 is in a state in which the winch is running in order to move the load upwards or downwards.

Figure 1C:
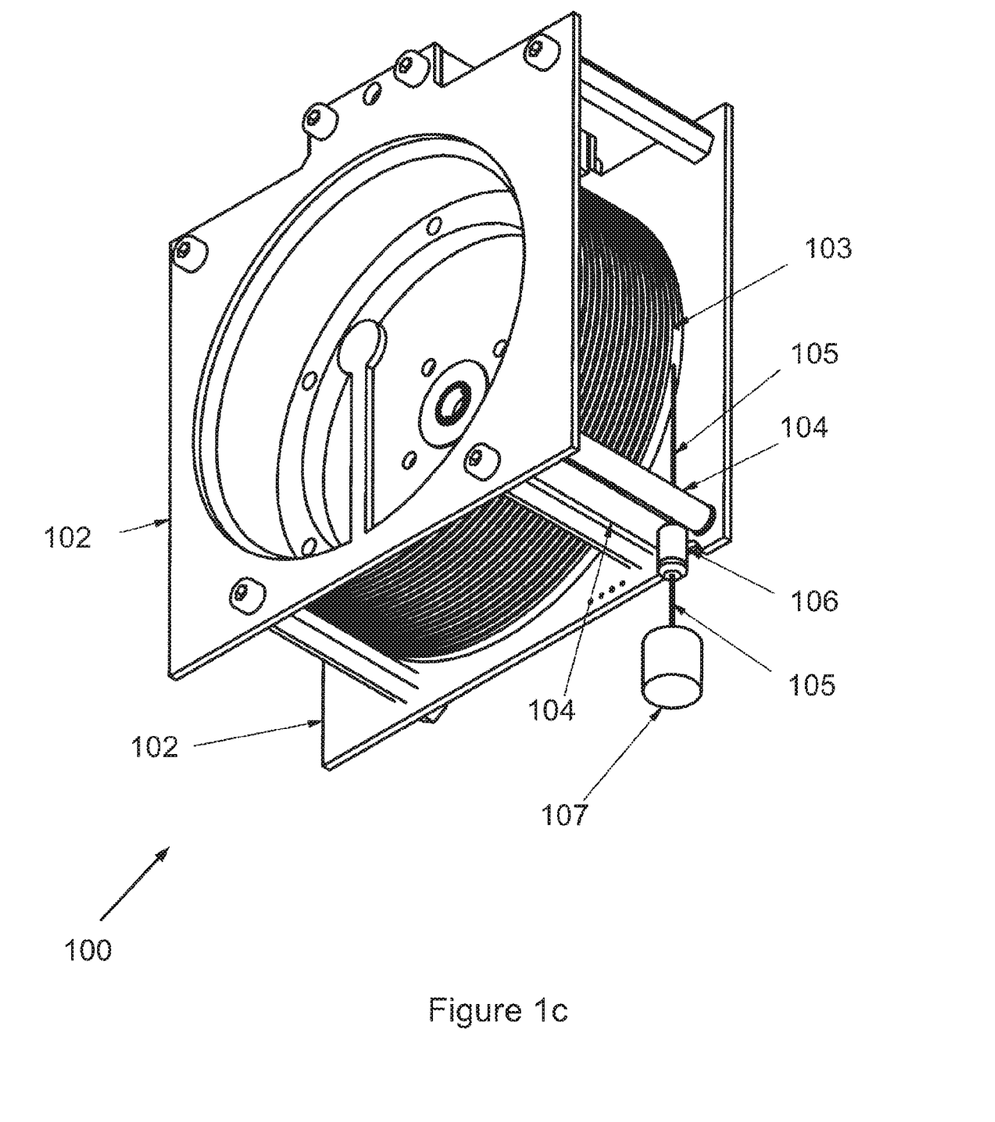

FIG. 1c shows a further schematic perspective view of the winch 100. In this example, the winch is in an overwinding event state when the overwinding sensor 106 contacts the contact member 104.

Figure 2A:
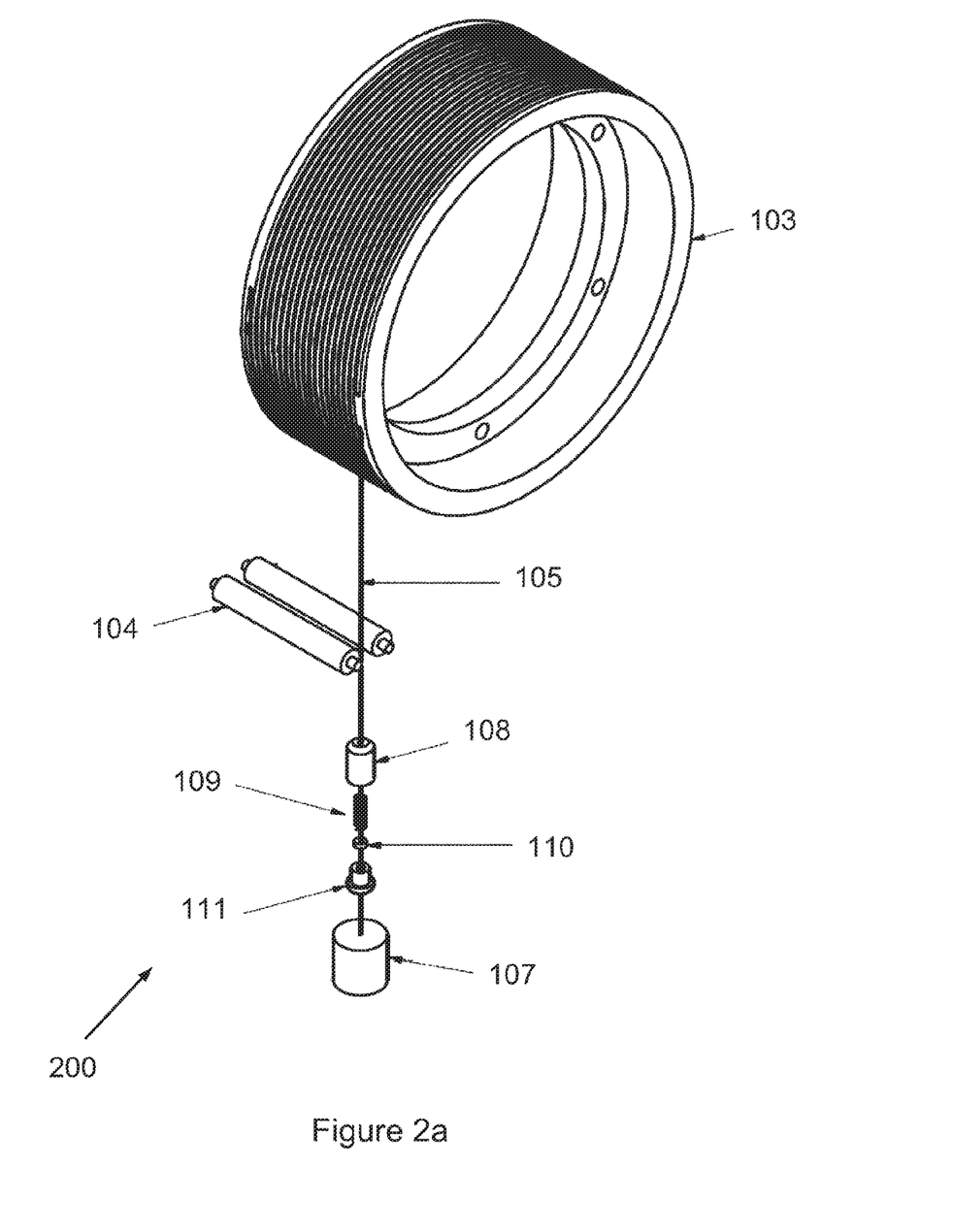
FIGS. 2a to c show schematic illustrations of parts of a winch according to some example implementations as described herein.

FIG. 2a shows a schematic perspective view of a winch 200 according to some example implementations as described herein. Certain parts of the winch, such as, but not limited to the frame in which the drum 103 is arranged, are not shown for illustration purposes.

The shown parts of the winch 200 may be comprised in the winch 100 as shown in FIGS. 1a to c and correspond to respective parts thereof. In particular, the winch 100 may be identical to the winch 200.

In this example, the overwinding sensor 106 is shown for illustrative purposes in a dismantled state. In this example, the rope 105 is arranged between the first and second electrically conducting contact members of the second electrically conducting member of the contact member 104. The rope 105 is then arranged to go through a first enclosure 108 and through a spring 109 of the overwinding sensor 106.

In this example, the overwinding sensor 106 comprises a support member 110 which is, in this example, firmly fixed to the rope 105.

In this example, the rope 105 then goes through a second enclosure 111 of the overwinding sensor 106 and is then ultimately connected to the load 107.

Figure 2B:
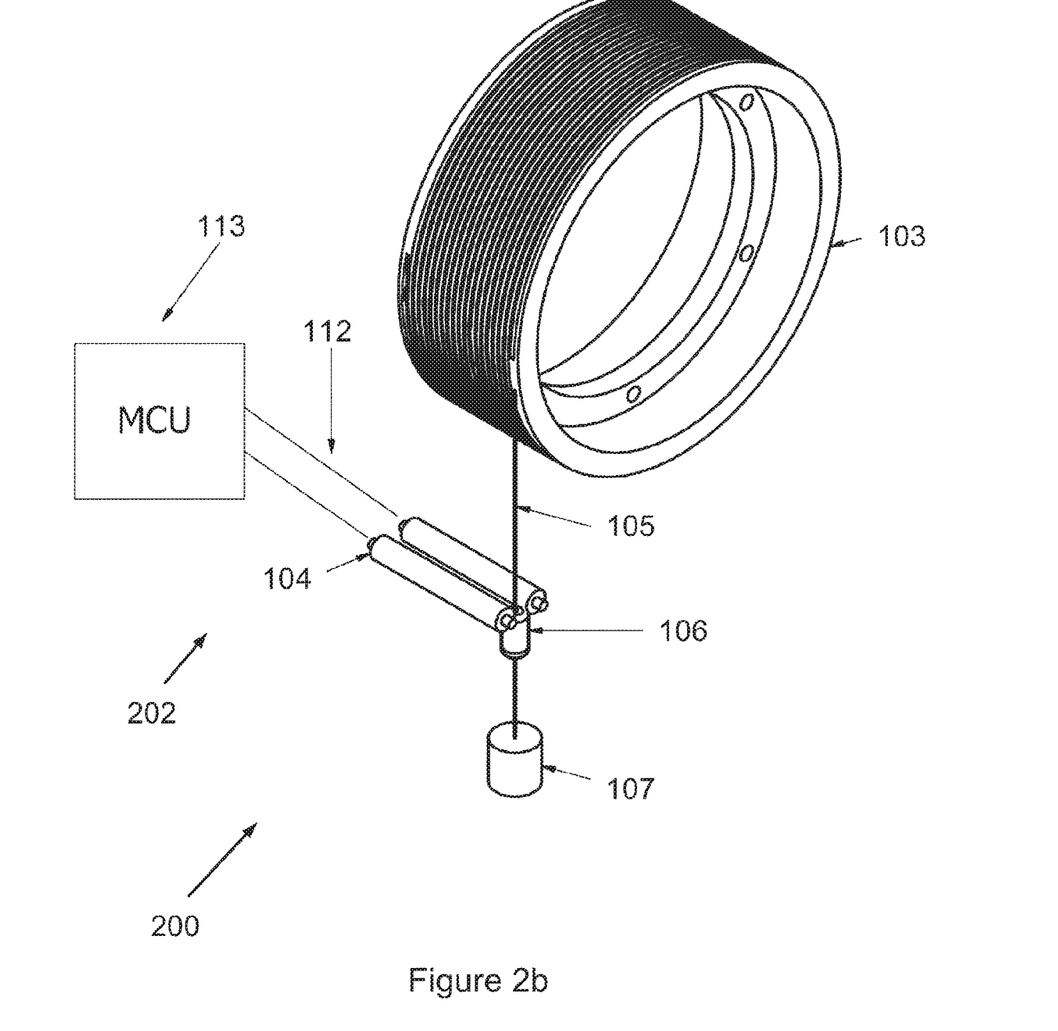

FIG. 2b shows a schematic perspective view of the winch 200 in an overwinding state.

In this example, when the overwinding sensor 106 contacts the first and second electrically conducting contact members of the contact member 104, the overwinding sensor 106 shortens the electrical circuit 202 between the contact member 104 via, in this example, its first enclosure 108.

In this example, the electric circuit comprises electric wires 112 which electrically couple the contact member 104 to the microcontroller 113.

Figure 2C:
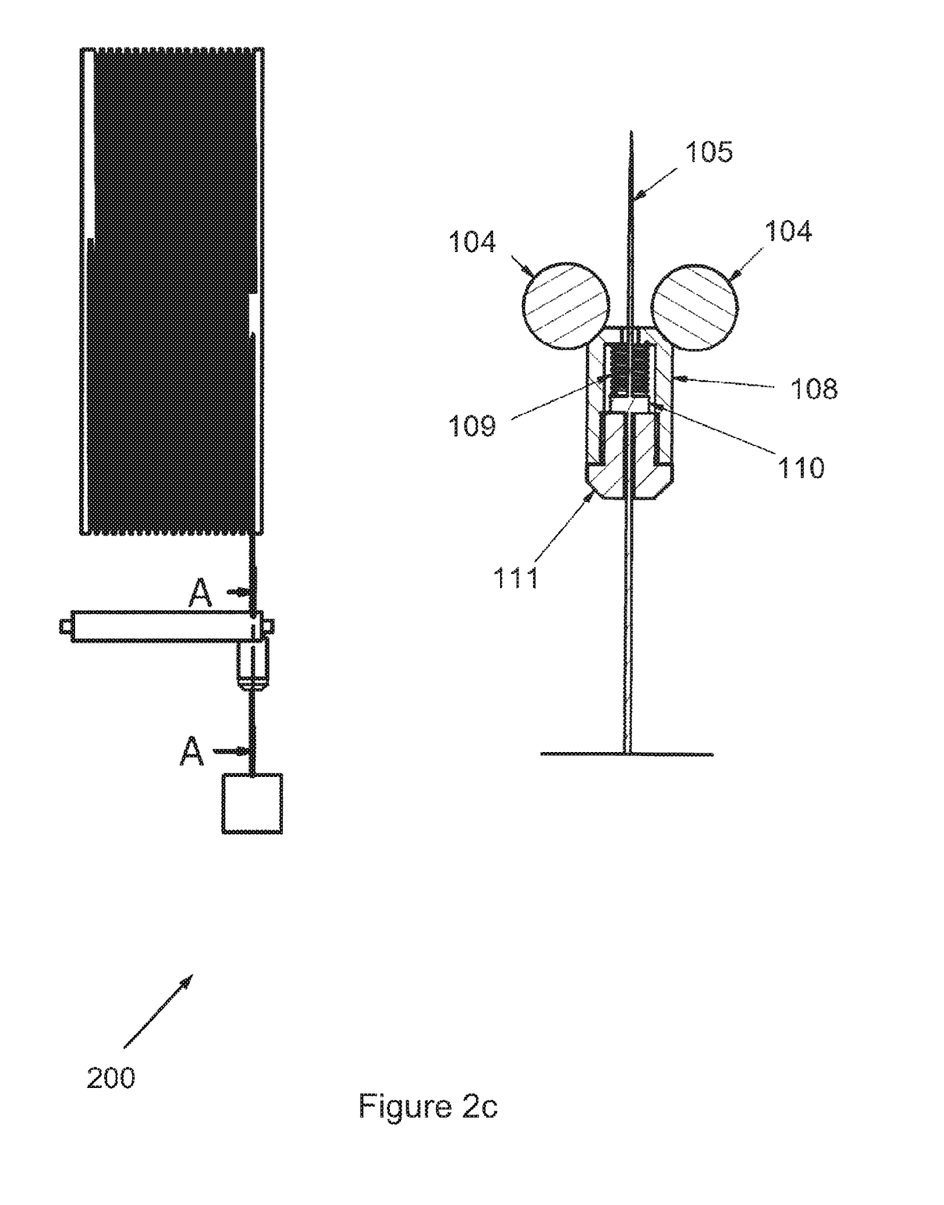

FIG. 2c shows a schematic side view (left-hand side) and a cross-sectional view (right-hand side) of the winch 200 and parts thereof, respectively. The winch 200 and parts thereof depicted in FIG. 2c may be identical to the winch 100 and corresponding, respective parts thereof as depicted in all above-described figures.

In this example, a length of the rope 105, donated in the figure on the left-hand side of FIG. 2c with A-A, is divided based on a ratio of 3:1 from the position where the electrical contact is established between the overwinding sensor and the contact member to the respective points A of the rope.

The image on the right-hand side of FIG. 2c shows a cross-sectional side view of parts of the winch depicted on the left-hand side of FIG. 2c, in which the winch 200 is in the overwinding state. In this example, the spring 109 is in a compressed state.

In this example, the (compression) spring 109 is arranged between the support member 110 and the first enclosure 108 of the overwinding sensor. In this example, the support member 110 is fixed firmly to the rope 105. It may hereby be fixed at the end of the rope 105 or at any other desired position on the rope 105.

In the state shown in FIG. 2c, the overwinding sensor is in electrical contact with the contact member 104 via the enclosure 108.

In this example, the overwinding sensor comprises a second enclosure 111, whereby the spring 109 and the support member 110 are arranged within the enclosures 108 and 111.

In this example, the first enclosure 108 is made from an electrically conducting material.

Figure 3:
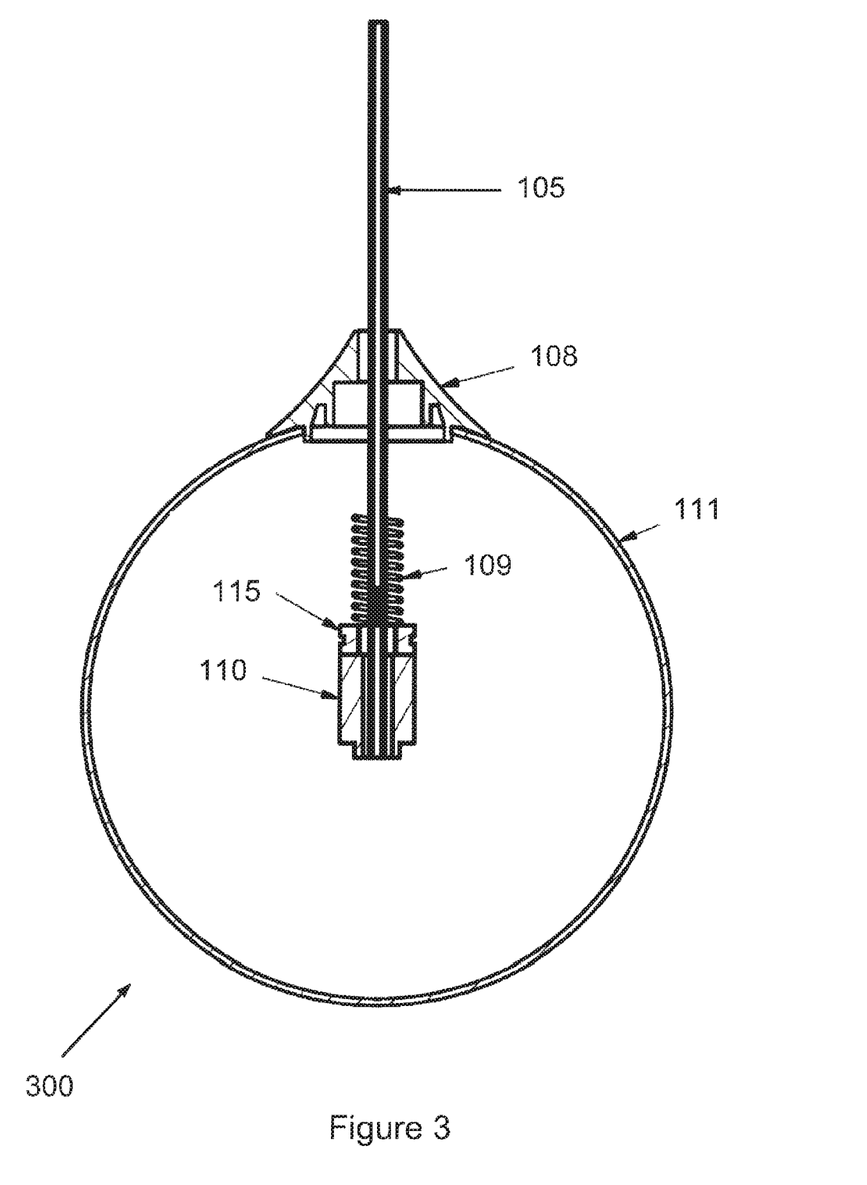
FIG. 3 shows a schematic illustration of a lighting device according to further example implementations as described herein.

FIG. 3 shows a schematic cross-sectional side view of a lighting device 300 according to some example implementations as described herein. Parts of the winch 100 and/or 200 are integrated in this example into the lighting device 300.

The winch and components thereof as depicted in FIGS. 1 and 2 may be integrated into the lighting device 300.

In this example, the first enclosure 108 is a decorative cover for the lighting device 300.

Furthermore, in this example, the lighting device 300 comprises a ball bearing 115.

The first enclosure 108 is made from or comprises an electrically conducting material which is configured to contact the contact member when the lighting device is being raised to a specific position (second position as referred to above).

In this example, the second enclosure 111 is a lamp shade for the lighting device 300.

Figure 4:
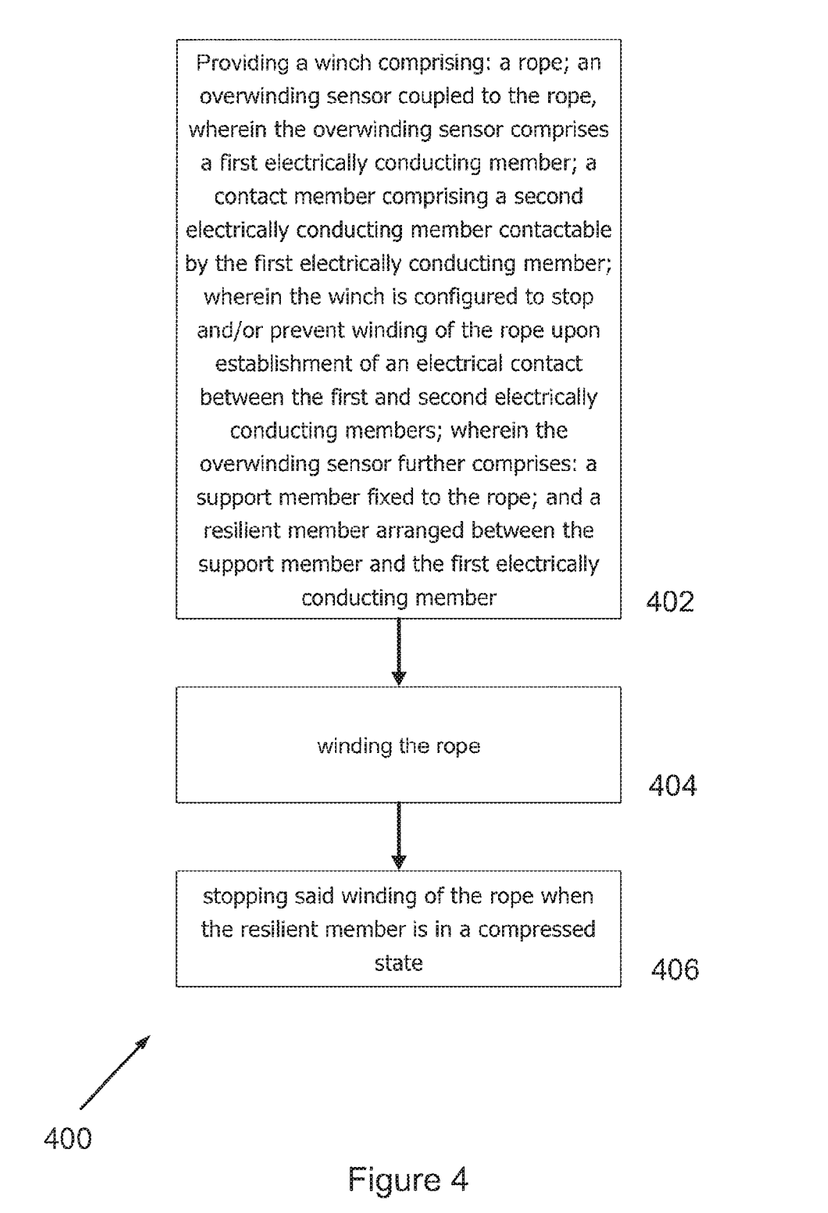
FIG. 4 shows a flowchart of a method according to some example implementations as described herein.

FIG. 4 shows a flowchart of a method according to some example implementations as described herein.

In this example, the method comprises, at step 402, providing a winch comprising: a rope; an overwinding sensor coupled to the rope, wherein the overwinding sensor is moveable between a first position and a second position upon winding and/or unwinding of the rope, and wherein the overwinding sensor comprises a first electrically conducting member; a contact member comprising a second electrically conducting member which is contactable by the first electrically conducting member when the overwinding sensor is in the second position, wherein the second electrically conducting member is not contactable by the first electrically conducting member when the overwinding sensor is in the first position; and wherein the winch is configured to stop and/or prevent and/or hamper winding of the rope upon establishment of an electrical contact between the first electrically conducting member and the second electrically conducting member when the overwinding sensor is in the second position, wherein the overwinding sensor further comprises: a support member fixed to the rope; and a resilient member arranged between the support member and the first electrically conducting member, wherein the resilient member is configured to bias the support member away from the contact member upon winding of the rope while the overwinding sensor is in the second position (in particular wherein the winch further comprises a load, wherein the resilient member is integrated into the load, and wherein the resilient member separates the rope from the load). At step 404, winding of the rope is being performed. This step is performed for so long until the resilient member is in a compressed state, at which point, at step 406, winding of the rope is being stopped.

In some examples, when the overwinding sensor first contacts the contact member upon winding of the rope (for example to raise the load), the resilient member may, in some examples, not yet be in a compressed state. Further winding of the rope may be required for the resilient member to be in a compressed state. Alternatively, the resilient member may already be in the compressed state when the overwinding sensor first contacts the contact member upon winding of the rope (for example to raise the load). This may be particularly advantageous so as to ensure that, when winding the rope until the overwinding sensor contacts the contact member, this contact is soft, i.e. not as hard as if the rope were raised and the overwinding sensor were to hit the contact member without a previous deceleration.

The winch according to the examples as described herein allows in particular for overwinding prevention and a precise calibration of the position at which winding of the rope should be stopped and/or prevented and/or hampered (i.e. further winding of the rope should be made more difficult).

Furthermore, the examples of the winch as described herein allow for removing excessive tension from the rope when overwinding occurs.

Further still, in example implementations in which a spring is used, rope slack may be prevented in particular when the winch is transported and/or unpowered. This may be achieved when the drum is stopped from being rotated when the spring is in a compressed state, after which the winch is unpowered.

Use of the resilient member may be particularly advantageous as the contacting of the overwinding sensor with the contact member may be ensured to be smooth, whereby the resilient member may be in a compressed state when the overwinding sensor contacts the contact member.

Moreover, excessive energy from the rope may be absorbed when the load is stopped or when moving the load is started. Hereby, the spring may be integrated into the load. In this case, the load may not be directly connected to the rope.

Instead, a spring may be arranged between the rope and the load in order to separate the rope and the load from each other.

In any of the example implementations of the winch as described herein, the winch may comprise a motor unit which may be used to wind or unwind the rope. The motor unit may hereby be coupled to and controlled by the control unit, which control unit may be comprised in the winch or be external to the winch.

Any references as to the winch being in the overwinding state throughout the present disclosure refer to the overwinding sensor being in the second position, in particular whereby, in some examples, the resilient member (for example spring), when used, may be compressed.

No doubt many other effective alternatives will occur to the skilled person. It will be understood that the invention is not limited to the described embodiments and encompasses modifications apparent to those skilled in the art and lying within the scope of the claims appended hereto.

What is claimed is:

1. A winch comprising:
   a rope;
   an overwinding sensor coupled to the rope, wherein the overwinding sensor is moveable between a first position and a second position upon winding and/or unwinding of the rope, wherein the overwinding sensor comprises a first electrically conducting member, and wherein the overwinding sensor further comprises a support member which is fixed to the rope; and
   a contact member comprising a second electrically conducting member which is contactable by the first electrically conducting member when the overwinding sensor is in the second position, wherein the second electrically conducting member is not contactable by the first electrically conducting member when the overwinding sensor is in the first position,
   wherein the winch is configured to stop and/or prevent and/or hamper winding of the rope upon establishment of an electrical contact between the first electrically conducting member and the second electrically conducting member when the overwinding sensor is in the second position.

2. A winch as claimed in claim 1, further comprising an electric circuit, wherein the second electrically conducting member forms a part of the electric circuit, and wherein the electric circuit is shortened upon the establishment of the electrical contact between the first electrically conducting member and the second electrically conducting member when the overwinding sensor is in the second position.

3. A winch as claimed in claim 2, wherein the second electrically conducting member comprises a first electrically conducting contact member and a second electrically conducting contact member, wherein, when the overwinding sensor is in the second position, the first electrically conducting member of the overwinding sensor electrically connects the first electrically conducting contact member and the second electrically conducting contact member to shorten the electric circuit.

4. A winch as claimed in claim 3, wherein the rope is arranged between the first electrically conducting contact member and the second electrically conducting contact member.

5. A winch as claimed in claim 2, further comprising a control unit electrically coupled to the contact member, wherein the control unit is configured to detect the establishment of the electrical contact between the first electrically conducting member and the second electrically conducting member when the overwinding sensor is in the second position, wherein the control unit is configured to detect the establishment of the electrical contact between the first electrically conducting member and the second electrically conducting member by detecting that the electric circuit is shortened.

6. A winch as claimed in claim 1, further comprising a control unit electrically coupled to the contact member, wherein the control unit is configured to detect the establishment of the electrical contact between the first electrically conducting member and the second electrically conducting member when the overwinding sensor is in the second position.

7. A winch as claimed in claim 1, wherein the first electrically conducting member of the overwinding sensor comprises an enclosure of the overwinding sensor.

8. A winch as claimed in claim 1, further comprising a frame, wherein the frame comprises the contact member.

9. A winch as claimed in claim 1, wherein the overwinding sensor further comprises:
a resilient member arranged between the support member and the first electrically conducting member, wherein the resilient member is configured to bias the support member in a direction away from the contact member upon winding of the rope while the overwinding sensor is in the second position.

10. A winch as claimed in claim 9, further comprising a load, wherein the resilient member is integrated into the load, and wherein the resilient member separates the rope from the load.

11. A method of preventing rope slack of a rope of a winch, wherein the method comprises:
providing a winch comprising:
a rope;
an overwinding sensor coupled to the rope, wherein the overwinding sensor is moveable between a first position and a second position upon winding and/or unwinding of the rope, and wherein the overwinding sensor comprises a first electrically conducting member;
a contact member comprising a second electrically conducting member which is contactable by the first electrically conducting member when the overwinding sensor is in the second position, wherein the second electrically conducting member is not contactable by the first electrically conducting member when the overwinding sensor is in the first position; and
wherein the winch is configured to stop and/or prevent and/or hamper winding of the rope upon establishment of an electrical contact between the first electrically conducting member and the second electrically conducting member when the overwinding sensor is in the second position;
wherein the overwinding sensor further comprises:
a support member fixed to the rope; and
a resilient member arranged between the support member and the first electrically conducting member, wherein the resilient member is configured to bias the support member in a direction away from the contact member upon winding of the rope while the overwinding sensor is in the second position;
and wherein the method further comprises:
winding the rope; and
stopping said winding of the rope when the resilient member is in a compressed state.

* * * * *